United States Patent Office 3,740,348
Patented June 19, 1973

3,740,348
ESTERS OF CYANIC ACID
Ernst Grigat, Cologne-Stammheim, and Rolf Putter, Dusseldorf Germany, assignors to Farbenfabriken Bayer Aktiengesellschaft, Leverkusen, Germany
No Drawing. Application Feb. 12, 1968, Ser. No. 704,948, now Patent No. 3,553,244, which is a continuation of abandoned application Ser. No. 339,333, Jan. 22, 1964. Divided and this application Feb. 16, 1970, Ser. No. 14,845
Int. Cl. C07c 119/04
U.S. Cl. 260—453 AL
1 Claim

ABSTRACT OF THE DISCLOSURE

Cyanic acid esters having the formula $$R(O-C\equiv N)_x$$

in which R is an alkyl or cycloalkyl radical containing an electron-attracting substituent, an aryl radical, a substituted aryl radical free from the simultaneous presence of sterically hindered substituents in both ortho positions to the corresponding —O—C≡N group or a heterocyclic radical, and $x$ is a whole number from 1 to 6.

---

This is a divisional application of copending U.S. application 704,948, filed Feb. 12, 1968, now U.S. Pat. 3,553,244, which in turn is a streamline continuation application of copending parent U.S. application Ser. No. 339,333, filed Jan. 22, 1964, now abandoned.

The present invention relates to novel esters of cyanic acid and to a process for their production.

It is known that trimeric products, predominantly triazine derivatives are obtained when phenolates are reacted with cyanogen halide. These products are formed by way of the bis-aryl esters of imidocarbonic acid which can also be isolated as a reaction product (see Ann. 287, 319 and Ber. 28, 2467).

If cyanogen halides are reacted with isolated and dried metal salts of hindered phenols i.e. phenols which carry hindering substituents in both positions ortho to the OH group (e.g. 2,6-di-tert.-butyl phenol or 2-tert.-butyl-6-cyclohexylphenol), it is possible, using this very restricted group of phenols, to obtain for the first time true cyanic acid esters of the constitution R—O—C≡N, which until recently were unknown (German patent specification 1,079,650). Apart from this very restricted special type, no other organic esters of cyanic acid have so far been described.

One object of the present invention are novel esters of cyanic acid having the general formula $$R(O-C\equiv N)_x$$

In this formula R designates aryl radicals, substituted aryl radicals which do not carry sterically hindered substituents in both ortho positions and heterocyclic radicals, for instance, substituted phenyl radicals of the formula

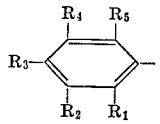

wherein $R_1$, $R_2$, $R_3$, $R_4$ and $R_5$ represent hydrogen, dialkylamino, acylamino, arylamino, halogeno, nitro, sulfonic acid, sulfonic acid ester, sulfonic acid amide, carboxylic acid, carboxylic acid ester, carboxylic acid amide, alkoxy, phenoxy, acyloxy, acyl, aldehydo sulfono, rhodano, isorhodano, alkylmercapto, arylmercapto, acylmercapto and cyano radicals, $R_1$, $R_2$, $R_3$ and $R_4$ may further represent alkyl, cycloalkyl, aralkyl and aryl radicals and $R_5$ may in addition represent methyl, ethyl, propyl and n-butyl radicals, other aromatic radicals as for instance unsubstituted and substituted α- and β-naphthyl, bisnaphthyl, phenanthryl and anthraquinyl radicals, heterocyclic radicals for instance quinonyl, pyrazolyl, 3-pyridyl, benztriacyl, carbacyl, benzthiazolyl and benzimidacyl radicals.

R may further stand for an alkyl radical which contains an electron-attracting substituent in α- or β-position to the oxygen bearing C-atom, e.g. halogen as chlorine, bromine, fluorine; acyl, as acetyl, e.g. in acetylactone (enolform reacts); carboxylic acid, as acetacetic acid; carboxylic acid ester, as acetacetic acid ethyl ester, sulfonic acid, sulfonic acid ester, nitro, cyano and acetylenic radicals and $x$ stands for a whole number from 1 to 6.

Examples for the novel esters of cyanic acid are, for instance: Phenylcyanate, 1,3-, 1,4 - biscyanatobenzene, 1,3,5 - triscyanatobenzene, mono- and polyalkylphenylcyanates, for instance 2-, 3- or 4- methyl, ethyl-, n-propyl-, isopropyl-, n-butyl-, isobutyl-, tert.-butyl-, n- or iso-pentyl-, n-or isohexyl, n- or isoheptyl-, n- or isooctyl-n- or isononyl-, n- or isodecyl, n- or isododecyl-, n- or isopalmityl-, n- or isostearyl-, ethene-, propene, butene- and ethynphenylcyanate; 1-methyl- 3,5-dicyanatobenzene, 2,3-2,4-, 2,5-, 2,6-, 3,4-, 3,5-dimethyl-, diethyl-, dipropylphenylcyanates; 2,3,4-, 2,3,5-, 2,3,6-, 3,4,5-, 2,4,6-trimethyl-, triethyl- and tripropylphenylcyanates; 2,3,4,6- 2,3,4,5-, 2,3-5,6-tetramethyl-, tetraethyl- and tetrapropylphenylcyanates and 2,3,4,5,6 - pentamethylphenylcyanates. The above-mentioned alkyl radicals also can be mixed, e.g. 2,6 - dimethyl - 4 - tert. - butylphenylcyanate.

Cycloalkylphenylcyanates, for instance 2-, 3- or 4-cyclohexylphenylcyanate, 4,4' - biscyanato - bisphenylcyclohexane - (1,1); substituted alkylphenylcyanates, for instance 4-chlormethyl-, 4 - hydroxymethyl- and 3-trifluoromethylphenylcyanate; aralkylphenylcyanates, for instance 2-, 3- or 4-benzylphenylcanates, 4,4' - biscyanatobisphenylmethane, 4,4' - biscyanato - bisphenylmethylmethane, 4,4'-biscyanato - bisphenyl - bismethylmethane, 4,4' - biscyanato - bisphenylethane; arylphenylcyanates, for instance 2-, 3- or 4 - cyanatodiphenyl, 4,4' - dicyanatodiphenyl; alkyl, aryl, acylaminophenylcyanates, for instance 2-, 3- or 4 - dimethylamino-, 2-, 3- or 4 - diethylamino-, 2-, 3- or 4-acetylamino-, 2-, 3- or 4 - benzoylamino-, 2-, 3- or 4 - methacroylamino-, 4 - dimethylamino 3-methyl-, 3-dimethylamino - 4 - methyl, 4 - dimethylamino - 3,5 - dimethylphenylcyanate, N-methyl-N-formyl-4 - aminophenylcyanate, N - methyl - N - formyl - 4 - amino - 3 - methylphenylcyanate; halogenophenylcyanates, for instance 2-, 3- or 4 - chloro- or bromophenylcyanate, 2,3-, 2,4, 2,5-, 2,6, 3,4, 3,5 - dichloro(bromo)-phenylcyanate, 2- methyl - 5 - chloro-, 2-methyl-6-chloro-3 - methyl - 4 - chloro- 5 - methyl - 2 - chloro-, 2-methyl-4 - chloro-, 2 - methyl - 3 - chlorophenylcyanate, 3,5,3',5'-tetrachloro - 2,2'-dicyanatodiphenyl; nitrophenylcyanates, for instance 2-, 3- or 4 - nitrophenylcyanate, 2 - methyl-5-nitro-, 4-methyl - 2 - nitro-, 3-methyl - 4 - nitro-, 4 - methyl-3-nitro-, 3,5-dimethyl-4-nitrophenylcyanate.

Cyanates from phenylsulfonic and phenylcarbonic acids, their esters, amides, hydrazides, for instance 3- or 4- cyanato-benzoic acid or benzosulfonic acid, 2-, 3- or 4-cyanato-benzoic acid- (or benzosulfonic acid) methylester, -ethylester, -propylester, -isobutylester, -phenylester, -naphthylester, -halogenphenylester, 2-cyanato-5-chlorobenzoicacid ester, 2-cyanato-3-methylbenzoic acid ester, 5,5'-methylen-bis(2-cyanatobenzoic acid phenylester), 2-, 3- or 4-cyanatobenzoic acid dimethylamide, -diethylamide, -morpholylamide, i.e. -morpholino amide, -piperidylamide, i.e. -piperidino amide, -dimethylhydrazide; alkyloxy-, aryloxy-, acyloxyphenylcyanates, for instance 2-, 3- or 4-methoxy-, ethoxy-, propoxy-, isopropoxy-, butoxy-, phenoxy, acetoxy-, benzoxy-, N,N-dialkylcarbamato-, 4 - allyl - 2 - methoxy-phenylcyanate; acyl- or aldehydrophenylcyanates, for instance 2-, 3- or 4-cyanatobenzaldehyde, 2-, 3- or 4-acetyl-, propionyl-, benzoyl-phenylcyanate, 4-acetyl-1,3-dicyanatobenzene; cyanophenylcyanates, for instance 2-, 3- or 4- cyanophenylcyanate, 2,3-dicyano-1,4-dicyanatobenzene.

Phenylcyanates with S-containing substituents for instance 2-, 3- or 4-methylmercapto-, ethylmercapto-, propylmercapto-, phenylmercapto-, acetylmercapto-, benzoylmercapto-phenylcyanates, 3- or 4-rhodanophenylcyanates, 2,4-bismethylmercapto-3-methylphenylcyanate

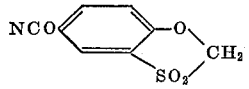

Cyanates from carbocyclic aromatic systems, other than phenyl: α- or β-naphthylcyanates, 1,3-, 1,4-, 1,5-, 1,6-, 1,7-, 1,8-, 2,3-, 2,6-, 2,7-dicyanatonaphthalene, 2,2'-dicyanatobisnaphthyl, α- or β-cyanatoanthraquinone, 1,4- or 1,5-dicyanatoanthraquinone, cyanatophenanthrene. These may bear the same substituents listed before in the phenyl series.

Cyanates from heterocyclic systems, for instance 3-, 5-, 6-, 7- or 8-cyanatoquinoline, 1-, 2-, 3-, or 4-cyanatocarbazol, -carboxylic acid, 5-cyanato-1-phenyl-3-methyl-pyrazole, 4-, 5-, 6-, or 7-cyanatobenztriazol, -benzthiazol, -benzimidazol, -benzpyrazole and the cyanic acid esters of the following alcohols: β,β,β-trichloroethanol, β,β,β-trifluoroethanol, β,β,β-tribromoethanol, butin-(2)-diol-1,4-acetylacetone, acetacetic acid ester, cyclohexane-(1)-ol-(1)-on-(3), hydroxyacetone, 2-nitroethanol, β,β-dichloroethanol, hydroxyacetonitrile, hydroxy acetic acid ethyl ester.

Another object of this invention is a process for the production of these cyanic acid esters.

It has been found that the esters of cyanic acid mentioned above and others may be prepared by reacting a hydroxyl compound of the formula $$R(OH)_x$$

wherein R and x have the same meaning as above, with a cyanogen halide especially cyanogen chloride and cyanogen bromide in a solvent and in the presence of a base. In this reaction it is of essential importance that less than an equivalent quantity based on the cyanogen halide of the base be present in each moment during the reaction. If the reaction is carried out in this manner the anions formed in the reaction of the hydroxyl compound with the base always find an excess of cyanogen halide and are thus prevented to react with cyanic acid ester already formed to yield e.g. iminocarbonic acid bis-esters.

As bases there may be used inorganic or organic bases.

Tertiary amines, for example trimethylamine, triethylamine, diethylaniline, pyridine or diethyl cyclohexylamine, are advantageously used as organic bases. As inorganic bases there may be used: Sodium hydroxide, potassium hydroxide, alkali alcoholates e.g. sodium methylate. The following solvents can be employed in the reaction: Hydrocarbons as benzene, xylene, toluene or heavy gasoline, chlorinated hydrocarbons as chlorobenzene, dichlorobenzene, carbon tetrachloride, chloroform or dichloroethane, nitrohydrocarbons as nitrobenzene, nitromethane, ethers and ketones as e.g. diethylether, acetone or diethylketone, esters and amides, e.g. acetic acid ethylester, dimethylformamide; further: dimethylsulfoxide, water, alcohols, e.g. methanol, isopropanol, ethanol, tert.-butanol, cyclohexanol, isoamylalcohol and mixtures thereof. Cyanogen chloride and cyanogen bromide, which are readily obtainable industrially, are to be considered as halocyanides and they may be added in solid, liquid or gaseous form.

When using cyanogen chloride, the reaction is advantageously carried out between —30° C. and its boiling point (+13° C.) but when using cyanogen bromide, temperatures from —30° C. up to 65° C. can also advantageously be used.

Suitable hydroxyl compounds of the aromatic and heterocyclic type are: Phenol, resorcin, hydroquinone, phloroglucinol, mono- and polyalkylphenols, e.g. 2-, 3- or 4-methyl-, ethyl-, n-propyl-, isopropyl-, n-butyl-, isobutyl-, tert.butyl-, n- or isopentyl-, n- or isohexyl-, n- or isoheptyl-, n- or isooctyl-, n- or isononyl-, n- or isodecyl-, n- or isododecyl-, n- or isopalmityl-, n- or isostearyl-, ethene-, propene-, butene- and ethynphenol; 1-methyl-3,5-dihydroxybenzene, 2,3-, 2,4- 2,5- 2,6-, 3,4-, 3,5-dimethyl-, diethyl-, dipropylphenols, 2,3,4-, 2,3,5-, 2,3,6- 3,4,5-, 2,4,6-trimethyl-, triethyl- and tripropylphenols 2,3,4,6-, 2,3,4,5-, 2,3,5,6-tetramethyl-, tetraethyl- and tetrapropylphenols and 2,3,4,5,6-pentamethylphenol. The above-mentioned alkyl radicals also can be mixed, e.g. 2,6-dimethyl-4-tert.butylphenols.

Cycloalkylphenols, for instance 2-, 3- or 4-cyclohexylphenol, 4,4'-bishydroxy-bisphenylcyclohexane-(1,1); substituted alkyl phenols, for instance 4-chlormethyl-, 4-hydroxymethyl- and 3 - trifluoromethylphenol; aralkyl phenols, for instance 2-, 3- or 4-benzylphenols, 4,4'-bishydroxybisphenylmethane, -methylmethane, -bismethylmethane; aryl phenols, for instance 2-, 3- or 4-hydroxydiphenyl, 4,4'-dihydroxydiphenyl; alkyl, aryl, acylamino phenols, for instance 2-, 3- or 4-dimethylamino-, 2-, 3- or 4-diethylamino-, 2-, 3- or 4-acetylamino-, 2-, 3- or 4-benzoylamino-, 2-, 3- or 4-methacroylamino-, 4-dimethylamino - 3 - methyl-, 3 - dimethylamino - 4 - methyl-, 4-dimethylamino - 3,5 - dimethylphenol, N - methyl - N-formyl-4-aminophenol, N-methyl-N - formyl - 4 - amino-3-methylphenol; halogeno phenols, for instance 2-, 3- or 4-chloro- or bromophenol, 2,3-, 2,4-, 2,5-, 2,6-, 3,4-, 3,5-dichloro(bromo)-phenol; 2-methyl-5-chloro-, 2-methyl-6-chloro-, 3-methyl-4-chloro-, 5-methyl-2-chloro-, 2-methyl-4-chloro-, 2-methyl-3-chlorophenol, 3,5,3',5' - tetrachloro-2,2'-dihydroxydiphenyl; nitrophenols, for instance 2-, 3- or 4-nitrophenol, 2-methyl-5-nitro-, 4-methyl-2-nitro-, 3-methyl-4-nitro-, 4-methyl-3-nitro-, 3,5-dimethyl - 4 - nitrophenol; hydroxyphenylsulfonic and -phenylcarbonic acids, their esters, amides, hydrazides, for instance 3- or 4-hydroxybenzoic acid or -benzolsulfonic acid, 2-, 3- or 4-hydroxybenzoic acid (or -benzolsulfonic acid-) methylester, -ethylester, -propylester, -isobutylester, -phenylester, -naphthylester, -halogenophenylester, 2-hydroxy-5-chlorobenzoic acid ester, 2-cyanato-3-methylbenzoic acid ester, 5,5'-methylen-bis(2 - cyanatobenzoic acid) phenyl-ester, -ethylester, 2-, 3- or 4-hydroxybenzoic acid dimethylamide, -diethylamide, -morpholylamide, i.e. -morpholino amide, -piperidylamide, i.e. -piperidino amide, -dimethylhydrazide; alkoxy-, aryloxy, acyloxyphenols, for instance 2-,3- or 4-methoxy-, ethoxy-, propoxy-, isopropoxy-, butoxy-, phenoxy-, acetoxy-, benzoxy-, N,N-dialkylcarbamato-, 4-allyl-2-methoxyphenol; acyl- or aldehydrophenols, for instance 2-, 3- or 4-hydroxybenzaldehyde, 2-, 3- or 4-acetyl-, propionyl-, benzoylphenol, 4-acetyl-1,3-dihydroxybenzene; cyanophenols, for instance 2-, 3- or 4-cyanophenol, 2,3-dicyano-1,4-dihydroxybenzene.

Phenols with S-containing substituents, for instance 2-, 3- or 4-methylmercapto-, ethylmercapto-, propylmercapto-, phenylmercapto-, acetylmercapto-, benzoylmercaptophenols, 3- or 4-mercaptophenols, 2,4-bismethylmercapto-3-methylphenol,

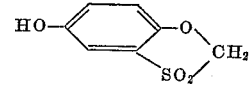

Hydroxy compounds from carbocyclic aromatic systems other than phenyl: α- or β-naphthol, 1,3-, 1,4-, 1,5-, 1,6-, 1,7-, 1,8-, 2,3-, 2,6-, 2,7-dihydroxynaphthalene, 2,2'-bis-hydroxybisnaphthyl - 1,1', α- or β - hydroxyanthraquinone, 1,4-, 1,5 - dihydroxyanthraquinone, hydroxyphenanthrene.

These may bear the same substituents listed before in the phenyl series.

Hydroxyl compounds from heterocyclic systems, for instance 3-, 5-, 6-, 7- or 8-hydroxyquinoline, 1-, 2-, 3- or 4-hydroxycarbazol, -carboxylic acid, 5-hydroxy-1-phenyl-3-methyl-pyrazole, 4-, 5-, 6- or 7-cyanatobenztriazol, -benzthiazol, -benzimidazole, -benzpyrazole.

Suitable hydroxyl compounds of the aliphatic type are substituted alcohols e.g. $\beta,\beta,\beta$-trichloroethanol, $\beta,\beta,\beta$-trifluoroethanol, $\beta,\beta,\beta$-tribromoethanol, butin-(2)-diol-1,4-acetylacetone (enolized), acetic acid ester (enolized), cyclohexene-(1)-ol-(1)-on-(3), hydroxyacetone, 2-nitroethanol, $\beta,\beta$-dichloroethanol, hydroxyacetonitrile, hydroxy acetic acid ethyl ester.

The reaction is expediently carried out using about equivalent quantities of the reactants. A small excess of cyanogen halide is preferred. Cyanogen halide and the base can be introduced into the phenol simultaneously. In this case one has to take care that there is always a little excess of cyanogen halide present in the reaction mixture, but it is also possible for the base to be added dropwise to a mixture of the phenol and cyanogen halide. After the reaction has ended, the product is separated from the amine hydrochloride and the cyanate is recovered, very pure and in good yield by evaporating the solvent or is precipitated by adding water. In the few instances where the product precipitates together with the amine hydrochloride, the latter is leached out with water.

The esters of cyanic acid produced according to the process are new and can be used as intermediates in the preparation of pharmaceuticals, e.g. the $\beta,\beta,\beta$-trichloroethyl ester of cyanic acid may be hydrolyzed to $\beta,\beta,\beta$-trichloroethyl carbamate, a known narcotic and anesthetic, i.e. voluntal (see Hackh's Chemical Dictionary, third edition).

The esters of cyanic acid produced according to the process of the invention may be reacted with water according to the following reaction $$R-OCN \xrightarrow[H_2O]{HCl} R-O-\overset{O}{\underset{\|}{C}}-NH_2$$

to form carbamic acid esters. These carbamic acid esters are known to influence the growth of plants as described in U.S. Pats. 2,776,197; 2,776,196 and 2,812,247; for instance:

(1) 11.9 parts by weight of phenylcyanate are added slowly to 100 parts by weight of 10% hydrochloric acid while cooling. The compound

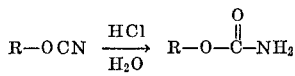

precipitates and is recovered by filtration. Yield 13.8 parts by weight or 97% of the theoretical, M.P. 142–143° C. This compound is described in Example 2 of U.S. Pat. 2,776,196 as influencing the growth of plants.

(2) To a solution of 13.3 parts by weight of 4-methylphenylcyanate in acetone is added aqueous concentrated hydrochloric acid. 14.5 parts by weight of

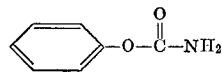

having a M.P. of 151–152° C. are precipitated. This compound is disclosed in column 2, line 58 of U.S. Pat. 2,776,197 as influencing the growth of plants.

(3) Analogously from 2-methyl-phenylcyanate there is produced the compound

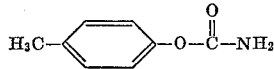

having a M.P. of 158–159° C. This compound is disclosed in column 2, line 56 of U.S. Pat. 2,776,197.

(4) From 2,4-dichlorophenylcyanate and water there is obtained

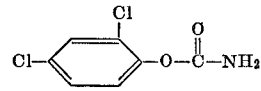

having a M.P. of 140–142° C. This compound is disclosed in Example 5 of U.S. Pat. 2,776,197.

The invention is illustrated by the following examples:

EXAMPLE 1

33 g. of liquid cyanogen chloride are introduced dropwise into a vigorously-stirred solution of 47 g. of phenol in 135 ml. of carbon tetrachloride at a temperature from 0° C. to 10° C. Simultaneously, 51 g. of triethylamine are introduced dropwise at such a rate that it is always in a slight deficiency as compared with cyanogen chloride. After completing the reaction, the precipitated triethylamine hydrochloride is separated by suction filtering and the filtrate is distilled. After removing the carbon tetrachloride, the product distils at 81 to 82.5° C./16 mm. Hg. Yield of phenyl cyanate: 42.5 g. (=72% of the theoretical).

*Analysis.*—Calculated (percent): C, 70.5; H, 4.2; N, 11.7; O, 13.5. Found (percent): C, 70.55; H, 4.78; N, 11.72; O, 13.22.

The infra-red spectrum shows a strong band at 4.5μ.

EXAMPLE 2

Similar to Example 1, except that instead of liquid cyanogen chloride being introduced dropwise, the same quantity of gaseous cyanide chloride is blown in at room temperature over 1 hour. Yield: 41 g. (=70% of the theoretical).

EXAMPLE 3

108 g. of p-cresol are dissolved in 250 ml. of ether. 66 g. of cyanogen chloride and 102 g. of triethylamine are slowly added dropwise (triethylamine kept in a slight deficiency as compared with cyanogen chloride) at a temperature from 0° C. to 10° C. After completing the addition, the stirring is continued for 30 minutes and the precipitated triethylamine hydrochloride is suction-filtered. The ether is removed from the filtrate and the remaining product is distilled. B.P. 87.5 to 90° C./10 mm. Hg. Yield of 4-methylphenyl cyanate: 100 g. (=75% of the theoretical). The infra-red spectrum shows a strong band at 4.5μ.

EXAMPLE 4

55 g. of cyanogen bromide are introduced at room temperature and in small portions into 72 g. of α-naphthol, dissolved in 250 ml. of acetone, while stirring vigorously. At the same time, 51 g. of triethylamine are introduced dropwise, as in Example 1. After the reaction has ended, stirring is continued for 30 minutes and the product is separated from the triethylamine hydrobromide which is washed with acetone. The acetone is distilled off from the filtrate in vacuo 82 g. of crude α-naphthyl cyanate (=96.5% of the theoretical) remain, B.P. 161° C./11 mm. Hg.

The distilled pure product completely crystallises.
M.P.: sintering with trimerisation from 45° C.
The infra-red spectrum shows a strong band at 4.5μ.

EXAMPLE 5

As in Example 4, except that α-naphthol is replaced by 72 g. of β-naphthol and cyanogen bromide is replaced by 33 g. of cyanogen chloride, added dropwise at 0° C. Crude yield: 83 g. of β-naphthyl cyanate, B.P. 131° C./1.5 mm. Hg.

The distilled pure product crystallises thoroughly.
M.P.: sintering with trimerisation from 90° C.
The infra-red spectrum shows a thick band at 4.5μ.

EXAMPLE 6

110 g. of hydroquinone are substantially dissolved in 500 ml. of acetone and then 135 g. of cyanogen chloride are poured into the solution at 0° C. 210 g. of triethylamine are then added dropwise so slowly that the temperature remains below 10° C. After completing the addition, stirring is continued for 30 minutes and the product is filtered off with suction from the triethylamine hydrochloride. Upon concentrating the acetone-containing filtrate, 122 g. of p-phenylene dicyanate (=76% of the theoretical) precipitate as white crystals (M.P. 108 to 110° C.).

*Analysis.*—Calculated (percent): C, 60.0; H, 2.5; O, 20.0; N, 17.5. Found (percent): C, 60.1; H, 2.73; O, 20.29; N, 17.58.

The infra-red spectrum shows a strong double band at $4.5\mu$.

EXAMPLE 7

If the hydroquinone in Example 6 is replaced by 4,4'-dihydroxydiphenyl dimethylmethane, then 4,4'-dicyanatodiphenyldimethylmethane (M.P. 77 to 80° C.) is obtained in the same way.

*Analysis.*—Calculated (percent): C, 73.4; H, 5.04; O, 11.5; N, 10.1. Found (percent): C, 73.43; H, 5.09; O, 12.05; N, 10.10.

The infra-red spectrum shows a strong double band at $4.5\mu$.

EXAMPLE 8

33 g. of cyanogen chloride and 51 g. of triethylamine are added, in the same way as in Example 1, to 61 g. of 2,4-dimethyl phenol, dissolved in 250 ml. of benzene. After stirring and separating the precipitated triethylamine hydrochloride by suction filtration, the benzene is removed in vacuo and the product is distilled. B.P. 75 to 77° C./2 mm. Hg.

Yield of 2,4-dimethylphenyl cyanate: 65 g. (=89% of the theoretical). The infra-red spectrum shows a strong band at $4.5\mu$.

EXAMPLE 9

An experiment carried out in a manner similar to Example 8 in nitrobenzene produced a product with an identical infra-red spectrum.

EXAMPLE 10

33 g. of cyanogen chloride and 72 g. of tri-n-propylamine are added dropwise to 75 g. of 2,6-diethyl phenol dissolved in 300 ml. of acetone. After filtering off the amine hydrochloride, the acetone is removed in vacuo and the product distilled. B.P. 86 to 90° C./2.3 mm. Hg. Yield of 2,6-diethyl phenyl cyanate: 75 g. (=85% of the theoretical). Strong infra-red band at $4.5\mu$.

EXAMPLE 11

Similarly to Example 10, there is formed from 3,5-dimethyl phenol 3,5-dimethyl phenyl cyanate (B.P. 81 to 83° C./2 mm. Hg). Strong infra-red band at $4.5\mu$.

EXAMPLE 12

80 g. of 2,5-dihydroxynaphthalene are dissolved in 500 ml. of acetone and 61 g. of cyanogen chloride are added at 0° C. 105 g. of triethylamine are introduced dropwise while cooling and stirring at such a rate that the temperature does not exceed 13° C. The product and triethylamine hydrochloride precipitate. The water-insoluble 2,5-dicyanatonaphthalene is freed from the triethylamine hydrochloride by stirring with water.

90 g. of the 2,5-dicyanatonaphthalene (=76% of the theoretical) are obtained as white powder. M.P.: the product sinters and polymerises on heating.

The infra-red spectrum shows a strong double band at $4.5\mu$.

EXAMPLE 13

53 g. of 1,3,5-trihydroxy bezene are dissolved in 250 ml. of acetone and 99 g. of cyanogen chloride and 155 g. of triethylamine are added at 0 to 10° C. in the same way as in Example 1. The product is filtered off with suction from the amine hydrochloride and the acetone is evaporated in vacuo. 54 g. of 1,3,5-tricyanatobenzene (M.P. 93 to 94° C.) are precipitated. It shows a strong infra-red band at $4.5\mu$.

EXAMPLE 14

66 g. of cyanogen chloride and 102 g. of triethylamine are added to 153 g. of 4-nitro-3-methyl phenol, dissolved in 500 ml. of acetone as in Example 1. After filtering off with suction from the amine hydrochloride and concentrating the filtrate, there is obtained 4-nitro-3-methyl phenyl cyanate (M.P. 53° C.).

EXAMPLE 15

4-chlorophenyl cyanate (M.P. 38 to 40° C.) is obtained from 4-chlorophenol in a manner analogous to Example 14.

EXAMPLE 16

4-acetylaminophenyl cyanate (M.P. 123 to 125° C.) is obtained from 4-acetylaminophenol in a manner analogous to Example 14.

EXAMPLE 17

4-dimethylamino - 3 - methylphenyl cyanate (B.P. 100° C./10 mm. Hg) is obtained from 4-dimethylamino-3-methylphenol in a manner analogous to Example 14.

EXAMPLE 18

4-nitrophenyl cyanate (M.P. 65 to 66° C.) is obtained from 4-nitrophenol in a manner analogous to Example 14.

EXAMPLE 19

5-cyanato quinoline (M.P. 73° C.) is obtained from 5-hydroxyquinoline in a manner analogous to Example 14.

EXAMPLE 20

130 g. (1 mol) of 3-chlorophenol, dissolved in acetone, were cooled to 0° C. 60.5 ml. of cyanogen chloride were then added and 145 ml. of triethylamine were so introduced dropwise that the temperature did not exceed 13° C. After filtering off with suction from precipitated triethylamine hydrochloride, the filtrate was distilled. After the solvent, the 3-chlorophenyl cyanate distilled over as a yellow oil at 81 to 85° C./12 mm. Hg. Yield: 108 g. of distilled product (=70% of the theoretical). The infra-red spectrum shows a strong band at $4.5\mu$. More trimerised product was left in the distillation flask.

EXAMPLE 21

2-methoxyphenyl cyanate (B.P. 93° C./2.3 mm. Hg) is obtained in a yield of 82.5% from 2-methoxyphenol in a manner analogous to Example 20. The infra-red spectrum shows a strong band at $4.5\mu$.

EXAMPLE 22

3-acetoxyphenyl cyanate (B.P. 115 to 125° C./1.8 mm. Hg) is obtained from 3-acetoxyphenol in a manner analogous to Example 20. The infra-red spectrum shows a strong band at $4.5\mu$.

EXAMPLE 23

In a manner analogous to Example 6, using resorcinol instead of hydroquinone, m-phenylene dicyanate is obtained in a yield of 66% in the form of white crystals (melting point 80° C.). The infra-red spectrum shows a strong double band at $4.5\mu$.

EXAMPLE 24

In a manner analogous to Example 3, but using o-cresol instead of p-cresol, 2-methyl phenyl cyanate (B.P. 71 to 72° C./2.5 mm. Hg) is obtained in a yield of 92%. The infra-red spectrum shows a strong band at 4.5μ.

EXAMPLE 25

In a manner analogous to Example 3, 3-methyl phenyl cyanate (B.P. 70 to 71° C./0.8 mm. Hg) is obtained from m-cresol. The infra-red spectrum shows a strong band at 4.5μ.

EXAMPLE 26

In a manner analogous to Example 14, p-carbomethoxyphenyl cyanate (M.P. 46° C.) is obtained in a yield of 70% from methyl p-hydroxybenzoate. The infra-red spectrum shows a strong band at 4.5μ.

EXAMPLE 27

In a manner analogous to Example 14, 4-acetyl phenyl cyanate (M.P. 56° C.) is obtained in a yield of 78% from p-acetyl phenol. The infra-red spectrum shows a strong band at 4.5μ.

EXAMPLE 28

In a manner analogous to Example 14, 4 - cyanate-diphenyl (M.P. 48 to 50° C.) is obtained in a yield of 52% from 4-hydroxydiphenyl. The infra-red spectrum shows a strong band at 4.5μ.

EXAMPLE 29

112 g. (0.5 mol) of 1,4-dihydroxyanthraquinone are partially dissolved and partially suspended in 600 ml. of acetone. 61 ml. (1.1 mol) of cyanogen chloride and 140 ml. (1 mol) of triethylamine are added at a temperature from 0 to 10° C. 1,4 - dicyanatoanthraquinone precipitates together with triethylamine hydrochloride and after being filtered off with suction from the acetone-containing solution, it is obtained in pure form by washing out the amine hydrochloride. Yield: 120 g. (=87% of the theoretical). M.P.: from 140° C. with decomposition. The infra-red spectrum shows a strong band at 4.5μ.

EXAMPLE 30

In a manner analogous to Example 29, crude p-cyanatophenyl sulphonic acid with a strong infra-red band at 4.5μ, was obtained from p-hydroxyphenyl sulphonic acid. Separation fom the amine hydrochloride by water was impossible because of the solubility in water of the sulphonic acid. The product trimerized when treated with hot alcohol.

EXAMPLE 31

In a manner analogous to Example 14, there was obtained from 3-hydroxybenzoic acid a viscous substance, the infra-red spectrum of which shows in very pronounced form the infra-red band at 4.5μ, which is typical of cyanates, and thus consists predominantly of 3-cyanatobenzoic acid. The substance cannot be distilled but resinifies on being heated.

EXAMPLE 32

In a manner analogous to Example 14, 1-phenyl-3-methyl-5-cyanatopyrazole is obtained in the form of fine white crystals (M.P. 129 to 130° C.) from 1-phenyl-3-methyl - 5 - pyrazole. The infra-red spectrum shows a strong band at 4.5μ.

Analysis.—Calculated (percent): C, 66.35; H, 4.53; O, 8.05; N, 21.15. Found (percent): C, 66.25, 66.41; H, 4.87, 4.82; O, 8.18, 8.23; N, 21.11, 20.84.

EXAMPLE 33

In a manner analogous to Example 14, 2,4-dichlorophenyl cyanate is obtained as white crystals (M.P. 55° C.) from 2,4-dichlorophenol; the infra-red spectrum shows a strong band at 4.5μ.

EXAMPLE 34

In a manner analogous to Example 29, 4,4'-dicyanatediphenyl (M.P. 131° C.) is obtained in a yield of 85% from 4,4' - dihydroxydiphenyl. The infra-red spectrum shows a strong band at 4.5μ.

EXAMPLE 35

In a manner analogous to Example 20, 4-cyanato-3-methoxy-1-allyl benzene (B.P. 104 to 109° C./0.5 mm. Hg.) is obtained in a yield of 78% from 4-hydroxy-3-methoxy-1-allyl benzene. The infra-red spectrum shows a strong band at 4.5μ.

EXAMPLE 36

In a manner analogous to Example 4, 2,6-dichlorophenyl cyanate (M.P. 43 to 48° C.) is obtained from 2,6-dichlorophenol. The infra-red spectrum shows a strong band at 4.5μ.

EXAMPLE 37

In a manner analogous to Example 14, 4-chloro-2-cyanato-1-methylbenzene (M.P. 61 to 63° C.) is obtained in a yield of 69% from 4-chloro-2-hydroxy-1-methylbenzene. The infra-red spectrum shows a strong band at 4.5μ.

EXAMPLE 38

In a manner analogous to Example 20, 4-isododecyl phenyl cyanate (B.P. 160° C./0.2 mm. Hg) is obtained in a yield of 65% from 4-isododecyl phenol. The infra-red spectrum shows a strong band at 4.5μ.

EXAMPLE 39

In a manner analogous to Example 20, 2-chlorophenyl cyanate, a crystal clear liquid (B.P. 62 to 63° C./0.2 mm. Hg) is obtained in a yield of 91.5% from 2-chlorophenol. The infra-red spectrum shows a strong band at 4.5μ.

EXAMPLE 40

36.3 ml. of triethylamine were added dropwise to 27 g. of p-cresol and 15 ml. of cyanogen chloride dissolved in 75 ml. of acetonitrile at such a rate that the temperature did not exceed 13° C. After filtering off with suction from the precipitated triethylamine hydrochloride and extracting the solvent, the residue was distilled. 26 g. (=78% of the theoretical) of pure p-methyl phenyl cyanate (B.P. 60 to 61° C./1.4 to 1.5 mm. Hg) distilled over. The infra-red spectrum was identical with that of the product of Example 3.

EXAMPLE 41

An experiment carried out in a manner analogous to Example 40, in 100 ml. of ethyl acetate instead of acetonitrile proceeded in a completely identical manner and resulted in 28 g. (=84% of the theoretical) of p-methylphenyl cyanate.

EXAMPLE 42

In a manner analogous to Example 29, 85 g. of hydroquinone methylene-2-sulphone-1-ether, 30 ml. of cyanogen chloride and 70 ml. of triethylamine in suspension in acetone were reacted and, after removing the triethylamine hydrochloride from the reaction precipitate by stirring (with water), 70 g. (=72% of the theoretical) of

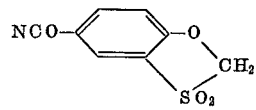

were obtained as a powder of M.P. 174° C. Infra-red: band at 4.5μ.

Analysis.—Calculated (percent): C, 45.5; H, 2.37; N, 6.64; O, 30.35; S, 15.15. Found (percent): 45.43; H, 2.65; N, 6.57; O, 30.51; S, 15.4.

EXAMPLE 41

In a manner analogous to Example 6, 4-acetyl-1,3-dicyanatobenzene is obtained in the form of white crystals (M.P. 78–80° C.) from 4-acetyl-1,3-dihydroxybenzene. Infra-red: band at 4.5μ.

EXAMPLE 44

In a manner analogous to Example 20, 68 g. (=82% of the theoretical) of 6-chloro-2-methylphenyl cyanate (B.P. 88 to 92° C./1.5 mm. Hg) are obtained from 71 g. of 6-chloro-2-methyl phenol.

EXAMPLE 45

In a manner analogous to Example 14, 79.5 g. (=95% of the theoretical) of 4-chloro-3-methyl phenyl cyanate (M.P. 37 to 38° C.) are obtained from 71 g. of 4-chloro-3-methyl phenol.

EXAMPLE 46

In a manner analogous to Example 14, 82 g. (=98.5% of the theoretical) of 4-chloro-2-methylphenyl cyanate (M.P. 61° C.) are obtained from 71 g. of 4-chloro-2-methylphenol.

EXAMPLE 47

In a manner analogous to Example 14, 81 g. (=97% of the theoretical) of 3-chloro-2-methylphenylcyanate (M.P. 54 to 55° C.) are obtained from 71 g. of 3-chloro-2-methylphenol.

EXAMPLE 48

In a manner analogous to Example 14, crude N,N-dimethyl-O-(3-cyanatophenyl)-carbamate.

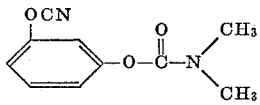

is obtained as a thick oil from N,N-dimethyl-O-(3-hydroxyphenyl)-carbamate. Infra-red: band 4.5 μ.

EXAMPLE 49

In a manner analogous to Example 14, 3-nitrophenyl cyanate (M.P. 60° C.) (yield: 75% of the theoretical) is obtained from 3-nitrophenol.

EXAMPLE 50

In a manner analogous to Example 14, 2,2'-dicyanate-1,1'-dinaphthyl (M.P. 134° C.) (yield 70% of the theoretical) is obtained from 2,2'-dihydroxy-1,1'-dinaphthyl.

EXAMPLE 51

In a manner analogous to Example 20, 4-cyclohexyl phenyl cyanate (B.P. 132–136° C./0.5 mm. Hg) (yield: 91% of the theoretical) is obtained from 4-cyclohexyl phenol.

EXAMPLE 52

In a manner analogous to Example 20, 4-t-butyl phenyl cyanate (B.P. 80° C./0.5 mm. Hg) (yield: 86% of the theoretical) is obtained from 4-t-butylphenol.

EXAMPLE 53

In a manner analogous to Example 20, 2-tert.-butylphenyl cyanate (B.P. 75° C./0.9 mm. Hg) (yield: 95% of the theoretical is obtained from 2-t-butyl phenol.

EXAMPLE 54

In a manner analogous to Example 14, 1,1-di-(4-cyanatophenyl) cyclohexane is obtained as a syrupy residue from 1,1-di-(4-hydroxyphenyl)-cyclohexane. Infra-red: band at 4.5 μ.

EXAMPLE 55

In a manner analogous to Example 20, 3-methoxyphenyl cyanate (B.P. 74° C./0.7 mm. Hg) (yield: 94% of the theoretical) is obtained from 3-methoxyphenol.

EXAMPLE 56

In a manner analogous to Example 14, 4-cyanatobenzaldehyde (M.P. 54° C.) (yield: 95% of the theoretical) is obtained from 4-hydroxybenzaldehyde.

EXAMPLE 57

In a manner analogous to Example 14, 2-nitro-4-methylphenyl cyanate (M.P. 110 to 114° C.) (yield: 94% of the theoretical) is obtained from 2-nitro-4-methyl phenol.

EXAMPLE 58

In a manner analogous to Example 14, 5-nitro-2-methylphenyl cyanate is obtained in a yield of 89% of the theoretical from 5-nitro-2-methylphenol.

EXAMPLE 59

In a manner analogous to Example 20, distilled 3-(trifluoromethyl)-phenyl cyanate (B.P. 55° C./1.5 mm.Hg) is obtained in a yield of 61% of the theoretical from 3-(trifluoromethyl)-phenol.

EXAMPLE 60

In a manner analogous to Example 20, distilled 2-carbethoxyphenyl cyanate (B.P. 97 to 100°/2.5 mm. Hg) is obtained in a yield of 70% of the theoretical from ethyl salicylate.

EXAMPLE 61

In a manner analogous to Example 14, 2-carbophenoxyphenyl cyanate (M.P. 56 to5 8° C.) is obtained in a yield of 98% from phenyl salicylate.

EXAMPLE 62

In a manner analogous to Example 14, 2,3-dicyano-1,4-dicyanatobenzene (decomposiing from 145° C.) is obtained from 2,3-dicyanohydroquinone. Yield: 60% of the theoretical.

EXAMPLE 63

In a manner analogous to Example 20, distilled 4-methyl mercaptophenyl cyanate (B.P. 103° C./0.8 mm. Hg) is obtained in a 79% yield from 4-methyl mercaptophenol.

EXAMPLE 64

In a manner analogous to Example 14, 2,4-di-(methylmercapto)-3-methyl phenyl cyanate (M.P. 81° C.) is obtained in a 95% yield from 2,4-di-(methylmercapto)-3-methyl phenol.

EXAMPLE 65

In a manner analogous to Example 29, 4-cyanatoazobenzene is obtained as a yellow powder of M.P. 119° C. from 4-hydroxyazobenzene. Yield: 85% of the theoretical.

EXAMPLE 66

In a manner analogous to Example 20, distilled 4-(1,3,3-trimethylpentyl)-phenyl cyanate (B.P. 140° C./2 mm. Hg) is obtained in a yield of 92% of the theoretical from 4-(1,3,3-trimethylpentyl)-phenol.

EXAMPLE 67

12 ml. of cyanogen chloride and 12 ml. of 45% aqueous NaOH were slowly introduced dropwise into 21.5 g. (0.2 mol) of p-cresol, suspended in 80 ml. of water, while stirring well. After completion of the reaction, stirring was continued for another 15 minutes and the substance clarified by filtration. The filtrate consisted of 2 layers. The organic phase was taken up in ether and the aqueous phase was extracted with ether, both ethereal phases were combined and dried with $Na_2SO_4$. After evaporation of the ether, 20.5 g. (=77% of the theoretical) of p-methylphenyl cyanate were left as an oil. The infra-red spectrum is identical with that of the product produced in acetone with triethylamine as base (see Example 3). When the final product was distilled 75% of the crude product boiled at 68° C./2–3 mm. Hg as a crystal-clear liquid and the remainder trimerised in the distillation flask. The infrared spectrum of the distilled product does not show any change from that of the crude product. The organic layer of the filtrate can be used directly for the further processing of the cyanic acid ester and does not have to be subjected to extraction and distillation.

EXAMPLE 68

108 g. (1 mol) of p-cresol were dissolved in a mixture of 30 ml. of isopropanol and 270 ml. of water and cooled to 0° C. 62 g. of cyanogen chloride were blown in and then 60 ml. of 45% NaOH were introduced dropwise at such a rate that the temperature did not exceed 13° C.

The two layers which formed were separated, the isopropanol was extracted from the organic phase and 112 g. (84% of the theoretical) of crude p-methylphenyl cyanate were left. Distillation gave 87 g. of crystal-clear distillate of B.P. 69°/2.5 mm. Hg. The remainder trimerised in the distillation flask. The infra-red spectrum is identical with that of the product obtained in Example 67.

EXAMPLE 69

123 g. (1 mol) of 2-methoxyphenol were suspended in 200 ml. of water. The mixture was heated until the phenol had melted and was then quickly cooled again while stirring strongly. 55 ml. of cyanogen chloride were then added to the finely crystalline suspension thus obtained and then 145 ml. (1 mol) of triethylamine were introduced dropwise at such a rate that the temperature did not exceed 15° C. After completing the reaction, the liquid substance was filtered off with suction from the precipitate. An organic layer was separated from the aqueous filtrate and 120 g. of 2-methoxyphenyl cyanate of B.P. 98 to 103° C./3 mm. Hg were recovered from this layer by distillation. Yield: 81% of the theoretical.

EXAMPLE 70

116 g. (1 mol) of solid sodium phenate were slowly added to a mixture of 55 ml. (1.1 mol) of cyanogen chloride, 130 ml. of isopropanol and 130 ml. of water at 0 to 10° C. After completing the reaction, stirring was continued for another 30 minutes and the substance filtered off from the precipitate. Two phases were formed in the filtrate. The organic layer was separated from the aqueous layer, and then initially the isopropanol was extracted and the residue distilled in vacuo. 51 g. (44% of the theoretical) of the phenyl cyanate could be obtained by distillation as a crystal-clear liquid of B.P. 75–80° C./1 mm. Hg. The distillation residue consisted of a mixture of trimer, which formed from the phenyl cyanate, during distillation and imidocarbonic acid bisphenyl ester.

EXAMPLE 71

40.5 g. of triethylamine were introduced dropwise into a mixture cooled to 0° C. and consisting of 22 g. of hydroquinone, 24 ml. of cyanogen chloride and 200 ml. of isopropanol at such a rate that the temperature did not exceed 13° C. After completion of the reaction, stirring was continued for 15 minutes and then the substance was filtered off with suction from the precipitated deposit, which contained both p-phenylene bis-cyanate and triethylamine hydrochloride. The amine hydrochloride was leached out with water and 28 g. (88% of the theoretical) of pure p-phenylene bis-cyanate M.P. 107–108° C. were obtained.

EXAMPLE 72

87.5 g. of 1-phenyl-3-methyl-5-hydroxypyrazole and 28 ml. of cyanogen chloride were dissolved in 150 ml. of ethanol and cooled to 0° C. 73 ml. of triethylamine were added dropwise at such a rate that the reaction temperature did not exceed 13° C. After filtering off triethylamine hydrochloride, there were precipitated from the filtrate, after standing overnight, 14 g. of very pure 5-cyanate-1-phenyl-3-methyl pyrazole in an extremely fine crystalline form and with the M.P. 129–130° C. Another 25 g. were obtained upon concentrating the filtrate. After complete removal of the alcohol, there remained a greasy residue containing further cyanate.

EXAMPLE 73

60 ml. of cyanogen chloride were initially placed in a mixture of 100 ml. of methanol and 100 ml. of water. 122 g. of 2,4-dimethylphenol and 101 g. of triethylamine were so added dropwise that the temperature in the reaction flask did not exceed 13° C. Two phases were formed and the organic phase was distilled. After the solvent, 100.5 g. (67% of the theoretical) of 2,4-dimethylphenyl cyanate distilled over as a crystal-clear liquid B.P. 73–75°/2 mm. Hg.

EXAMPLE 74

An experiment carried out at 20 to 30° C. in a manner analogous to Example 68, but using 106 g. of cyanogen bromide instead of 62 g. of cyanogen chloride, yielded 105 g. (79% of the theoretical) of p-methylphenyl cyanate.

EXAMPLE 75

76.5 g. of 4-nitro-3-methylphenol, dissolved in a mixture of 550 ml. of water and 30 ml. of 45% NaOH, were so introduced dropwise into a mixture of 28.5 ml. of cyanogen chloride and 100 ml. of water that the temperature did not exceed 13° C. The 4-nitro-3-methylphenyl cyanate precipitates as a light brown solid product. Yield, after washing and drying: 85 g. (94.5% of the theoretical) M.P. 51–52° C.

EXAMPLE 76

72.5 ml. of triethylamine were so added dropwise to 65.9 g. of 3-chlorophenol and 28.5 ml. of cyanogen chloride in 250 ml. of isopropanol that the temperature did not exceed 13° C. After further stirring and filtering off with suction from the amine hydrochloride, the isopropanol was extracted from the filtrate. There remained 53 g. (−69% of the theoretical) of 3-chlorophenyl cyanate, whose infra-red spectrum is identical with that of the product obtained according to Example 20. By rapid distillation, it is possible to obtain 38 g. of a pure product distilling over at 70°/0.5 mm. Hg as a yellowish oil. The remainder trimerises on heating in the distillation flask.

EXAMPLE 77

60 ml. of 45% NaOH solution were so introduced dropwise into a mixture of 108 g. (1 mol) of m-cresol, 57 ml. of cyanogen chloride and 450 ml. of benzene while stirring vigorously that the temperature did not exceed 13° C. After filtering off the precipitated NaCl, separating the water from the NaOH in a separating funnel and drying the filtrate, the solvent was extracted. There remained 114 g. (−86% of the theoretical) of crude 3-methylphenyl cyanate, whose infra-red spectrum conforms to that of the 3-methylphenyl cyanate produced according to Example 25. By distillation, it is possible to recover 81 g. of a crystal-clear product boiling at 71–72°/1 mm. Hg. The remainder trimerises in the distillation flask.

EXAMPLE 78

116 g. of sodium phenolate were slowly introduced into a mixture of 55 ml. of cyanogen chloride and 250 ml. of acetone at a temperature from 0° to 13° C. After filtering off with suction from the precipitated NaCl, first of all the solvent was extracted and the remainder was distilled. 62 g. (52% of the theoretical) of phenyl cyanate distilling over at 70 to 74°/2 mm. Hg were obtained. The distillation residue contained a large amount of trimer.

EXAMPLE 79

30 ml. of 45% NaOH were so introduced dropwise into a mixture of 62 g. of 2-methoxyphenol, 28.5 ml. of cyanogen chloride and 250 ml. of diethyl ether that the temperature did not exceed 13° C. After working up in a manner analogous to that indicated in Example 77, 60 g. (80% of the theoretical) of 2-methoxyphenyl cyanate were obtained, of which 60% were obtained by distillation as a crystal-clear liquid of B.P. 105°/12 mm. Hg. The infra-red spectrum agrees with that of the product obtained according to Example 21.

EXAMPLE 80

In a manner analogous to Example 79, 53 g. of cyanogen bromide were used instead of 28.5 ml. of cyanogen chloride and the reaction temperature was raised to the boiling point of the ether (35° C.) 63 g. (84.5% of the theoretical) of 2-methoxyphenyl cyanate are obtained. The infra-red spectrum is identical with that of the product obtained in Example 79.

EXAMPLE 81

69.5 g. of 4-nitrophenol and 28.5 ml. of cyanogen chloride were placed in 150 ml. of acetone and cooled to 0° C. 28 g. of powdered KOH were now introduced in small portions. After filtering off with suction from the precipitated KCl, the acetone solution was concentrated by evaporation. 33 g. of 4-nitrophenyl cyanate of M.P. 65° C. were precipitated. Another 25 g. of the 4-nitrophenyl cyanate were recoverd from the KCl precipitate. After dissolving the KCl in water.

The yield is therefore: 58 g. (71% of the theoretical). Infra-red spectrum: identical with that of the product obtained according to Example 18.

EXAMPLE 82

149.5 g. of 2,2,2-trichloroethanol are diluted with 250 ml. of acetone. Cyanogen chloride is injected into the mixture at 0° C. until there is an increase in weight of 61.5 g. 145 ml. of triethylamine are then so introduced dropwise while stirring well that the temperature does not exceed 13° C. After completing the reaction, the substance is filtered off from the precipitated triethylamine hydrochloride. After drawing off the acetone from the filtrate, there are obtained 170 g. of crude 2,2,2-trichlorethyl cyanate (97% of the theoretical). The product can be distilled in vacuo and it is obtained in a pure form in 93% of the theoretical yield, B.P. 70–71° C./5 mm. Hg; infrared spectrum: thick lines at 4.5$\mu$.

*Analysis.*—Calcd. (percent): C, 20.6; H, 1.2; N, 8.0; O, 9.2; Cl, 61.0. Found (percent): C, 21.05, H, 1.7; N, 8.04; O, 9.26; Cl, 58.8.

EXAMPLE 83

Following Example 82 but using 106 g. of solid cyanogen bromide instead of 61.5 g. of cyanogen chloride and carrying out the reaction at a temperature from 20 to 30° C., 2,2,2-trichlorethyl cyanate with the same boiling point and an identical infra-red spectrum to that of Example 82 is obtained.

EXAMPLE 84

75 g. of trichlorethanol are dissolved in 200 ml. of acetonitrile and cooled to 0° C. 28 ml. of cyanogen chloride and 11.3 g. of triisoamylamine are added dropwise separately in such a way that the canogen chloride is always in a slight molar excess over the amine. After completion of the reaction, the acetonitrile is extracted in vacuo and the trichlorethyl cyanate is distilled off. B.P. 58–60° C./2 mm. Hg; yield 70 g. (80.5% of the theoretical). Infra-red spectrum: identical with that of the product of Example 82.

Triisoamylamine hydrochloride remains as distillation residue.

EXAMPLE 85

12 ml. of 45% aqueous NaOH are introduced dropwise into a well-stirred mixture of 30 g. of 2,2,2-trichloroethanol, 12 ml. of cyanogen chloride and 100 ml. of water at a temperature from 0 to 10° C. The two layers which form are separated, the organic layer is taken up in ether and dried with Na$_2$SO$_4$. After extracting the ether, the crude trichloroethyl cyanate is distilled. B.P. 53–55° C./0.5 mm. Hg; yield: 26 g. (75% of the theoretical). Infrared spectrum: identical with that of the product of Example 82.

EXAMPLE 86

4.5 g. of triethylamine are slowly added to a solution of 5 g. of 2,2,2-trifluorethanol and 3 ml. of cyanogen chloride in acetone at a temperature from 0 to 10° C. After completing the reaction, the substance is filtered off with suction from the triethylamine hydrochloride and the acetone is extracted from the filtrate in vacuo.

There remain 5 g. (80% of the theoretical) of crude 2,2,2-trifluorethyl cyanate whose infra-red spectrum shows characteristic lines at 4.5$\mu$. The product can be distilled practically without residue and boils at 32° C./2 mm. Hg.

*Analysis.*—Calcd. (percent): C, 28.8; H, 1.6; F, 45.6; N, 11.2; O, 12.8. Found (percent): C, 29.4; H, 1.8; F, 43.5; N, 11.1; O, cannot be established in the presence of F.

EXAMPLE 87

Crude 2,2,2-tribromomethylcyanate is obtained in 85% yield. From 2,2,2-tribromomethanol, cyanogen chloride and triethylamine, in analogous manner to Example 86, only using benzene instead of acetone as solvent. The infra-red spectrum shows the typical line at 4.5$\mu$. The product trimerises on standing for a relatively long time or on heating but it can also be obtained in pure form as a clear liquid of B.P. 73° C./2.5 mm. Hg by careful distillation in vacuo.

EXAMPLE 88

2,2-dichlorethyl cyanate is obtained in 80% crude yield from 2,2-dichlorethanol, cyanogen chloride and triethylamine, in a manner analogous to Example 86. The infrared spectrum of the cyanate is similar to that of 2,2,2-trichlorethyl cyanate and has the typical line at 4.5$\mu$. The product is very easily decomposed under heat, but by careful vacuum distillation, it can be obtained in pure form as a clear liquid of B.P. 45–48° C./1–1.2 mm. Hg.

EXAMPLE 89

49 ml. of triethylamine are slowly introduced dropwise into a mixture of 33.6 g. (0.3 mol) of cyclohexane-1,3-dione, 18 ml. of cyanogen chloride and 100 ml. of acetone at a temperature below 10° C. After continuing stirring for one hour, the liquid substance is filtered off with suction from the precipitated triethylamine hydrochloride and the solvent is evaporated. Crude 1-cyanatocyclo-1-hexen-3-one is left as a light-coloured oil. Yield: 40 g. (=97% of the theoretical). The infra-red spectrum shows the typical strong line of the —O—C≡N— grouping at 4.5$\mu$ and thus readily permits distinction between the two possible reaction products:

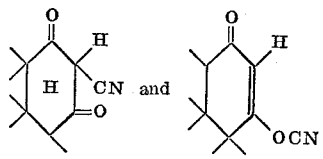

in favour of the expected product of the right-hand formula.

The product is decomposed on heating and, therefore, cannot be purified by distillation.

Analysis of the crude product.—Calculated (percent): C, 61.1; H, 5.12; N, 10.25; O, 23.4. Found (percent): C, 60.18; H, 5.78; N, 10.40; O, 22.67.

EXAMPLE 90

29 g. (=93% of the theoretical) of crude

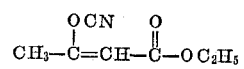

is obtained in a manner analogous to Example 89 from 26 g. of ethyl acetoacetate 12 ml. of cyanogen chloride and 20 g. of triethylamine. The infra-red spectrum again shows that the reaction took place on the enol form to give the cyanic acid ester. (Typical line at 4.5μ.) On heating the product decomposes and, therefore, cannot be purified by distillation.

EXAMPLE 91

In a manner analogous to Example 89, 30 g. (=95% of the theoretical) of crude

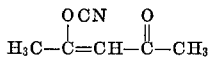

are obtained from 25 g. of acetyl acetone, 15 ml. of cyanogen chloride and 36.5 ml. of triethylamine. The infra-red spectrum shows the typical —O—C≡ band at 4.5μ.

The product decomposes upon distillation.

EXAMPLE 92

53 g. (78% of the theoretical) of crude 2-butine-1,4-dicyanate are obtained in a manner analogous to Example 89 from 43 g. (½ mol) of 2-butine-1,4-diol, 61.5 g. (1 mol) of cyanogen chloride and 101 g. (1 mol) of triethylamine. The infra-red spectrum shows the strong typical line at 4.5μ. On standing or heating gently, it decomposes in a violent exothermic reaction to yield resinous products.

EXAMPLE 93

In a manner analogous to Example 89, hydroxyacetone, cyanogen chloride and triethylamine, yield the undistillable cyanatoacetone, which has the characteristic line at 4.5μ.

What is claimed is:
1. β,β,β-trichloro-ethyl-cyanate.

References Cited

Houben: Chemical Abstracts, vol. 17, pp. 1622–3 (1923).

Stroh et al.: Chemical Abstracts, vol. 55, p. 21023 (1961).

LEWIS GOTTS, Primary Examiner

D. H. TORRENCE, Assistant Examiner

U.S. Cl. X.R.

260—247.2, 290 R, 304, 308 B, 309.2, 310 R, 315, 327 R, 396 R, 453 AR, 454, 456 P, 456 R, 465 R, 465.1, 469, 476 R, 479 C, 619 R, 999

UNITED STATES PATENT OFFICE
CERTIFICATE OF CORRECTION

Patent No. 3,740,348      Dated June 19, 1973

Inventor(s) Ernst Grigat et al

It is certified that error appears in the above-identified patent and that said Letters Patent are hereby corrected as shown below:

Col. 1, line 24, after "6" insert --can be used as intermediates in the preparation of pharmaceuticals --.

Col. 2, lines 51 and 52, insert comma --,-- after "2-methyl-6-chloro-" and insert comma --,-- after "3-methyl-4-chloro-".

Col. 14, line 41 change "(-69% of the theoretical)" to -- (=69% of the theoretical)--.

Col. 14, line 55 change "(-86% of the theoretical)" to -- (=86% of the theoretical)--.

Col. 15, line 12 cancel "35°" and substitute --34°--.

Col. 15, line 35 cancel "145 ml." and substitute -- 146 ml. --.

Signed and sealed this 29th day of January 1974.

(SEAL)
Attest:

EDWARD M. FLETCHER, JR.
Attesting Officer

RENE D. TEGTMEYER
Acting Commissioner of Patents